(12) United States Patent
Barraco

(10) Patent No.: US 9,253,990 B1
(45) Date of Patent: Feb. 9, 2016

(54) APPLICATOR DEVICE FOR FOOD PRODUCTS

(71) Applicant: Vincent Barraco, Palos Heights, IL (US)

(72) Inventor: Vincent Barraco, Palos Heights, IL (US)

(*) Notice: Subject to any disclaimer, the term of this patent is extended or adjusted under 35 U.S.C. 154(b) by 188 days.

(21) Appl. No.: 13/667,044

(22) Filed: Nov. 2, 2012

Related U.S. Application Data

(60) Provisional application No. 61/557,517, filed on Nov. 9, 2011.

(51) Int. Cl.
*A21B 5/02* (2006.01)
*A21C 15/00* (2006.01)
*A22C 7/00* (2006.01)

(52) U.S. Cl.
CPC .................. *A21B 5/02* (2013.01); *A22C 7/0023* (2013.01)

(58) Field of Classification Search
CPC .................. A21B 5/02; A21C 15/002; A22C 7/00–7/0023
USPC ....................................................... 118/13, 24
See application file for complete search history.

(56) References Cited

U.S. PATENT DOCUMENTS 3,221,672 A * 12/1965 Falco ........................... 99/450.1
3,255,690 A *  6/1966 Schack et al. .................... 99/356
5,243,899 A *  9/1993 Moshier et al. .............. 99/450.1

* cited by examiner

*Primary Examiner* — Dah-Wei D Yuan
*Assistant Examiner* — Stephen Kitt
(74) *Attorney, Agent, or Firm* — Cook Alex Ltd.

(57) ABSTRACT

A food product applicator device has a frame on which a slidable die plate is mounted for reciprocating movement created by a pneumatic cylinder. A food hopper mounted on the frame above the die plate has a bottom opening through which food is pressed into apertures in the die plate. Tracks on the frame constrain the die plate to horizontal motion. The frame is about 1.6 times as long as the die plate. The lengths of the frame and die plate are such that when the die plate moves neither the leading edge nor the trailing edge of the die plate extends beyond the ends of the frame. A driver plate laterally spaced from the food hopper has fingers that can be lowered to eject food pieces from the apertures onto a substrate located on a shelf below the die plate.

19 Claims, 6 Drawing Sheets

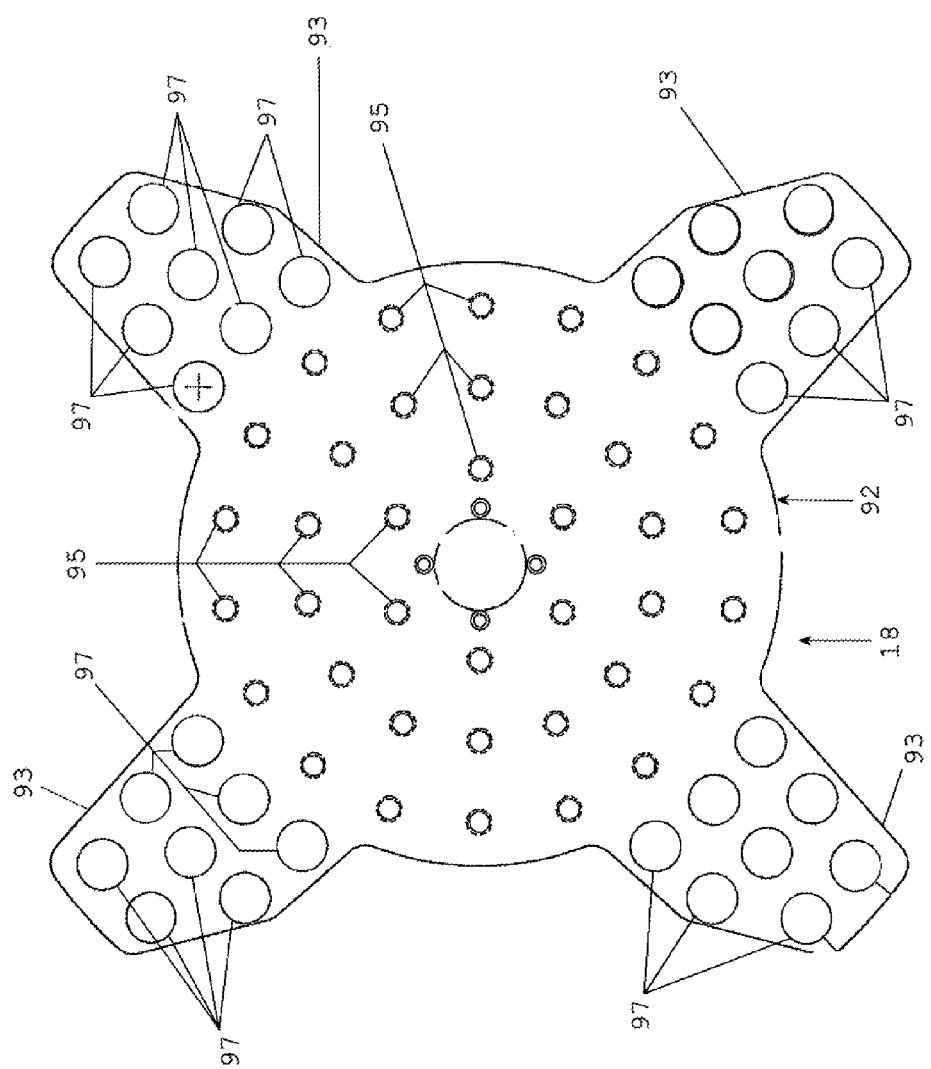

APPLICATOR DEVICE FOR FOOD PRODUCTS

CROSS REFERENCE TO RELATED APPLICATION

This application claims the benefit of U.S. Application Ser. No. 61/557,517, filed Nov. 9, 2011, the disclosure of which is incorporated herein by reference in its entirety.

BACKGROUND

This invention relates to an applicator device for food products. The applicator device is particularly adapted for depositing meat products, such as sausage, on a substrate, such as pizza. But it could be used in connection with any extrudable food product for deposition onto any suitable substrate. The substrate may or may not itself be edible.

Commercial preparation of pizza in non-mass production settings such as pizzerias, restaurants and the like typically involves a great deal of manual labor in preparing the dough, applying the sauce and applying the toppings. Application of toppings such as meat, vegetables and cheese is particularly time-consuming. For example, on a high-quality, 16-inch pizza there may be nearly 150 individual pieces of sausage. Training and supervision of staff to get them to apply the desired amount of toppings in an appropriate distribution can be a significant and on-going challenge. Sausage presents special challenges because its consistency in an uncooked state makes it difficult to handle and does not lend itself to quick and even distribution throughout the pizza. Consequently, pizza makers are tempted to develop poor habits to shorten the process, such as putting too little sausage on the pizza or distributing it unevenly or in piece sizes that are either too small or overly large chunks. The present invention addresses these problems by providing an applicator device for applying sausage in the correct amount, piece size and distribution on a pizza prior to cooking it.

While mass production machines are known for the purpose of depositing comestibles on a wide variety of substrates, the high cost of such machines generally makes them unsuitable for pizzerias and restaurants. Businesses of this type are not operating assembly lines making huge quantities of frozen or other products for the mass market. Instead they are generally making, cooking and selling pizzas to order for immediate consumption, either on or off premises. They may make and sell a lot of pizzas but not enough to support the large capital cost of mass production machines operating in an assembly line fashion. An applicator device for the restaurant trade must contend with these economic realities. It has to be relatively simple so its cost is within reach of the restaurant trade.

Pneumatic cylinders are one cost-effective way of effecting the necessary movements of applicator parts. While pneumatic cylinders generally work satisfactorily, they tend to be noisy due to the recurrent release of exhaust air. In the enclosed environment of a restaurant kitchen the exhaust air noise ranges from a nuisance to a genuine health hazard due to its repetitive and loud nature. Various devices for muffling exhaust air noise have been developed, including brass fittings that diffuse the exhaust air. While such fittings work when continually maintained, in a food applicator they suffer from the shortcoming of needing frequent cleaning. In the pizza setting it has been found that grease from sausage or other ingredients tends to collect in the exhaust fittings, eventually clogging them and rendering the pneumatic cylinders inoperative. To prevent clogging the pneumatic system of the machine has to be regularly disassembled and the exhaust fittings removed and cleaned. Naturally there is no convenient time for this to be done so it tends not to get done, leaving the machine vulnerable to outages at the worst possible times. Note that normal, daily cleaning of the food-bearing parts of the machine would not ordinarily include the pneumatic fittings so this is an extra step beyond regular cleaning of the applicator.

Another problem with known applicators is incompatibility between parts in terms of their wear characteristics. Aluminum transfer plates have been used for moving comestibles from one location to another. But such plates create excessive wear on the elastomeric gaskets that seal the intersection between a stationary food hopper and the moving transfer plate. An additional problem with known transfer plates is they have tended to be nearly as long as the frame of the applicator device. Thus when they move the transfer plate extends beyond the ends of the frame. This potentially exposes bystanders to contact with the moving transfer plate and also creates instability in the movement of the transfer plate itself. That is, its motion is not constrained to a perfectly planar movement as the end of the transfer plate can pitch up out of the desired plane of motion. In known applicator devices it has been found the transfer plate can pitch up by as much as an inch and a half. This results in leakage at the seal between the transfer plate and the food hopper and excessive wear on that seal.

SUMMARY

The applicator device of the present disclosure includes a frame on which the major components are mounted, including a food hopper, a die plate and a driver plate. The food hopper contains extrudable comestibles, such as sausage, and has a bottom opening and a pressing device that biases the comestibles toward the bottom opening. The die plate has a plurality of food-receiving apertures therein. The die plate is mounted for horizontal reciprocating motion which includes a filling stroke and a return stroke. In the filling stroke the apertures are moved under the hopper and into communication with the bottom opening of the hopper. The pressing device causes food to move out of the hopper and into the die plate's apertures. After all the apertures are exposed to the hopper's bottom opening during the filling stroke, the return stroke of the die plate moves the filled apertures to a deposition station which is laterally spaced from the hopper.

The deposition station includes a substrate mounting shelf on or in which a substrate, such as a pizza can be placed underneath the die plate. The driver plate is also located at the deposition station. The driver plate has a plurality of downwardly-facing fingers or push rods mounted on its underside. The pattern of the fingers matches that of the apertures in the die plate. Accordingly, when the die plate is in the deposition station each of the die plate apertures is aligned with one of the fingers in the driver plate. The driver plate is mounted for vertical, reciprocating motion between a rest position above the die plate and an eject position wherein the driver plate is lowered so the fingers extend through the die plate apertures, thereby pushing the food pieces in the apertures out and onto a substrate, such as a pizza, positioned on the mounting shelf below the die plate. An oiling mechanism may apply vegetable oil or the like to the bottom ends of the fingers to prevent the food pieces from sticking to the fingers.

The reciprocating motion of the die plate and driver plate may be created by pneumatic cylinders attached to the frame and plates. The pressing device may also include a pressure plate actuated by a pneumatic cylinder. Suitable control valves supply air pressure alternately to one side or the other of the pneumatic cylinders. All of the cylinders' exhaust lines are routed to a muffler mounted on the back of the frame. The muffler may comprise a foam material held in a cage. The foam material allows exhausting of air while dampening noise from the release of pressurized air.

It has been found that unless the frame is long enough to support the die plate throughout or nearly throughout the extent of its motion, the die plate has a tendency to pitch up out of its intended horizontal plane of motion. The result of such undesired pitching is the seal between the stationary food hopper and the movable die plate is compromised. In other words, the sausage leaks out where it is not supposed to. This has been addressed in the present disclosure by making the frame about 1.6 times as long as the die plate. By way of example only, and not by limitation, the frame length may be about 52 inches and the die plate length may be about 32 inches. Further, motion of the die plate is constrained by front and rear edge guides and front and rear upper retainers.

BRIEF DESCRIPTION OF THE DRAWINGS

FIG. 6 is a top plan view of the driver plate.

DETAILED DESCRIPTION

The applicator device of the present disclosure is illustrated generally at 10 in FIGS. 1-4. The major components of the applicator device include a frame 12, a food hopper 14, a die plate 16 (FIGS. 2 and 4), and a driver plate 18. The die plate is mounted near the top of the frame for reciprocating, horizontal movement underneath the hopper and driver plate. The driver plate is mounted on the frame for reciprocating, vertical movement. Details of the major components will now be described.

Figure 1:
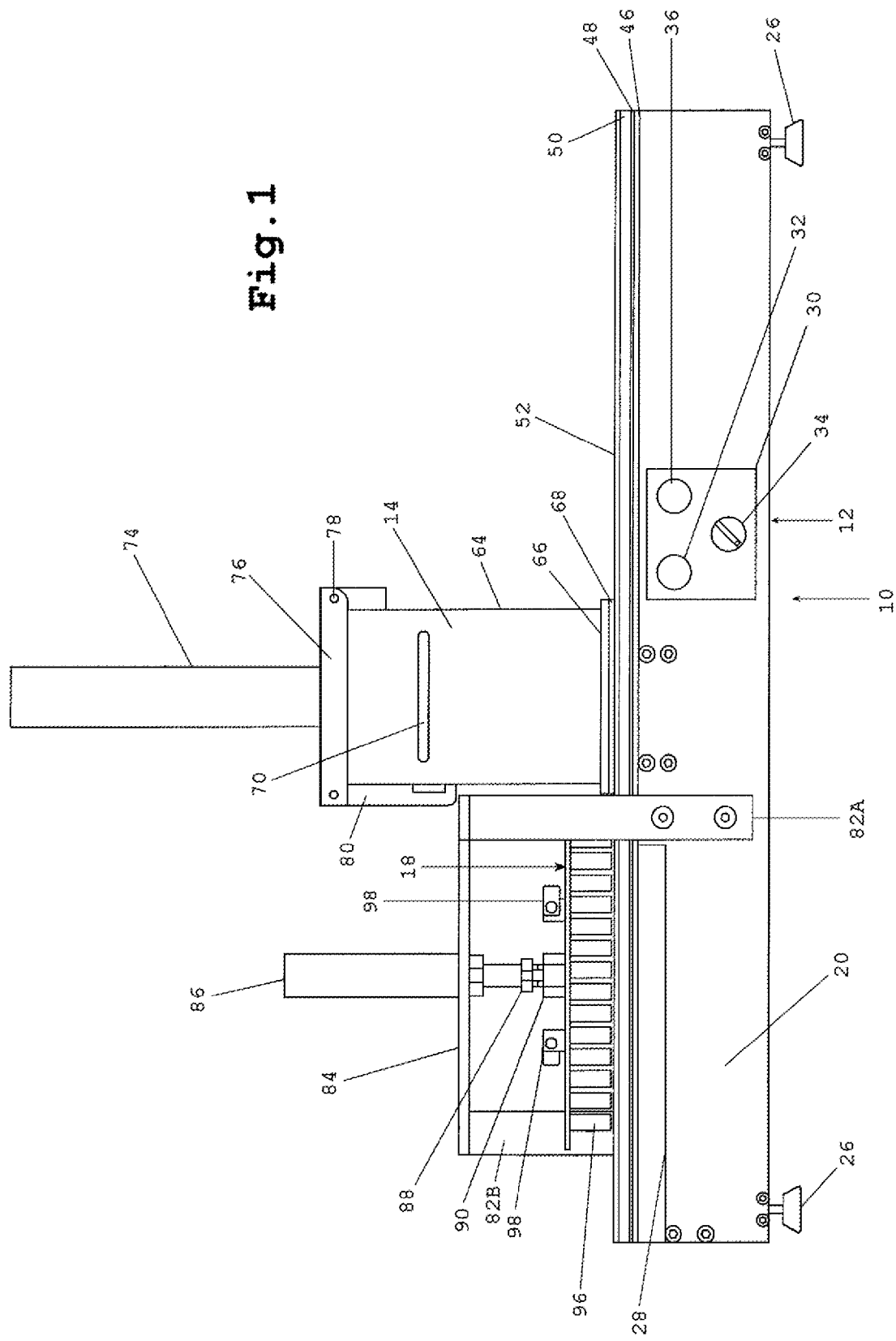
FIG. 1 is a front elevation view of the applicator device.
Figure 2:
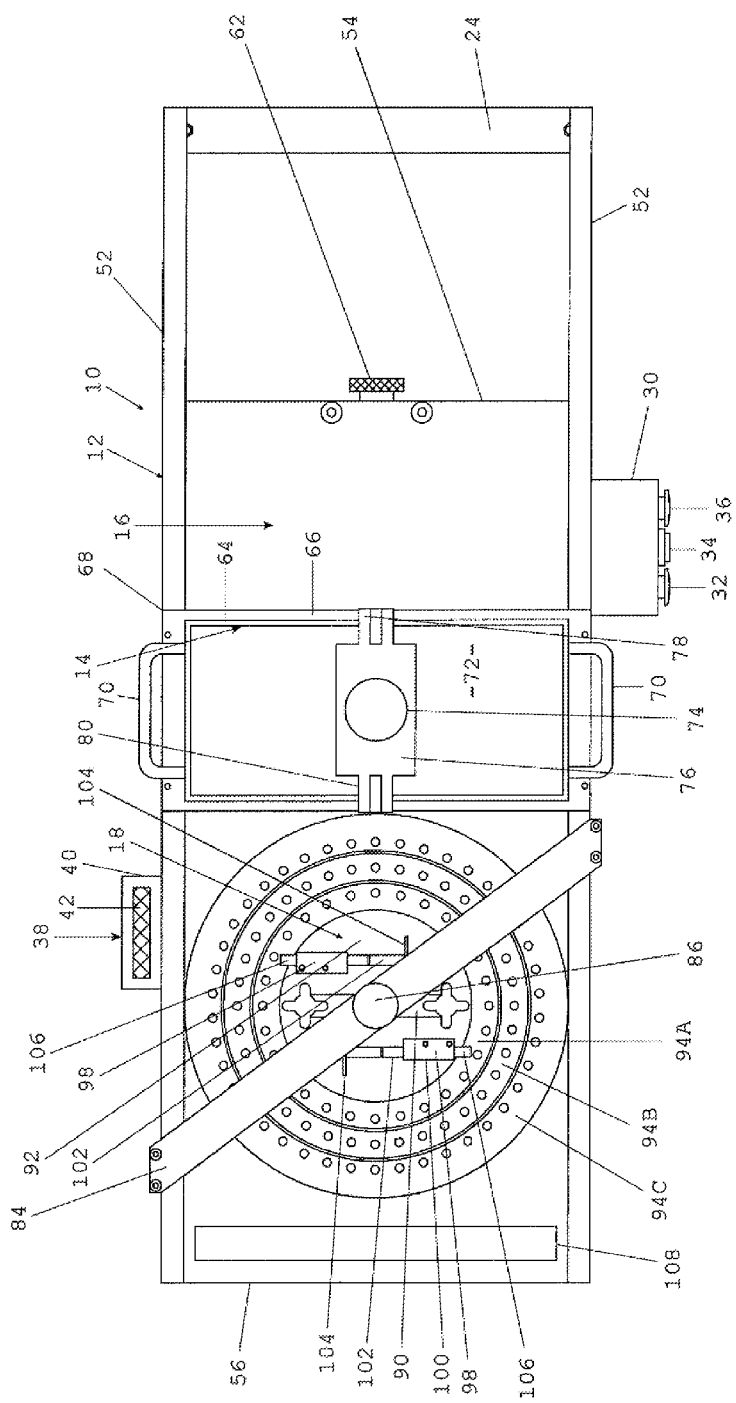
FIG. 2 is a top plan view of the applicator device.
Figure 3:
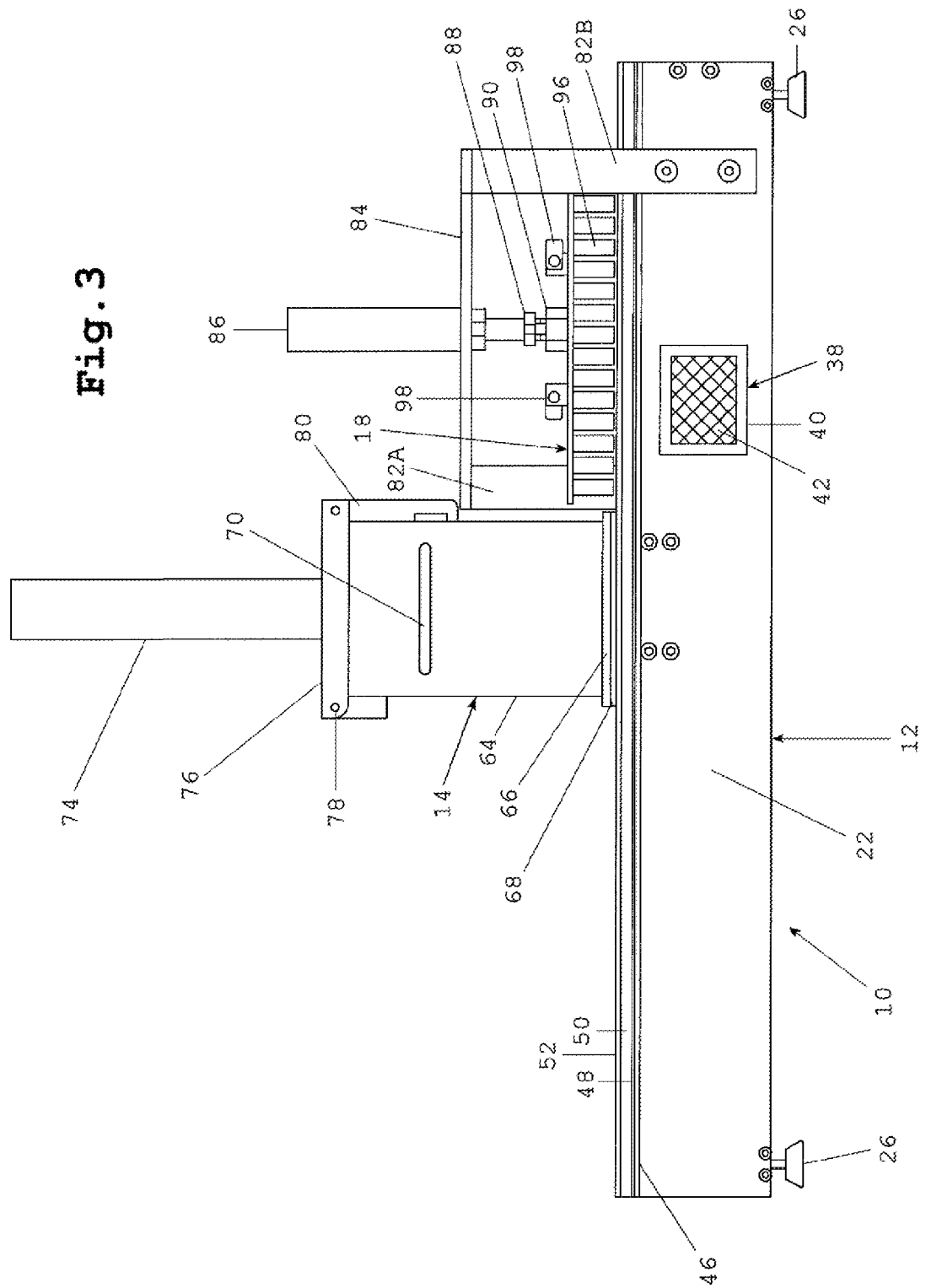
FIG. 3 is a rear elevation view of the applicator device.
Figure 4:
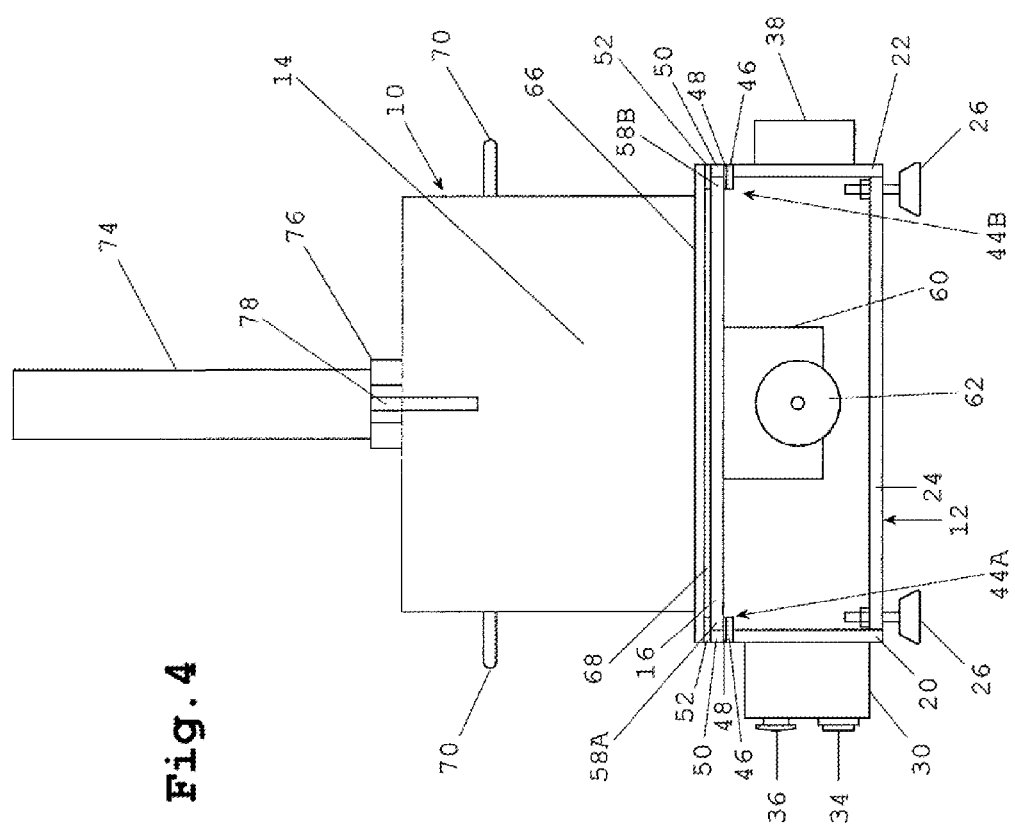
FIG. 4 is a right end elevation view of the applicator device.

The frame 12 as illustrated in this embodiment is a built-up structure including a front panel 20 and a rear panel 22 which are connected by two or more cross members, one of which is visible at 24 in FIGS. 2 and 4. Feet 26 at the four corners of the frame may be threadably engaged with the cross members 24 to provide support and permit the device to be leveled. The feet also raise the front and rear panels off of the table or the like on which the applicator device rests, thereby permitting easier cleaning of the table and underside of the frame. At the left side of the frame, as seen in FIG. 1, the upper portion of front and rear panels have cutouts which define a substrate mounting shelf 28. The shelf may include a plate (not shown) extending from the front panel to the rear panel to support a substrate, such as a pizza on a tray, for receiving food products deposited thereon.

The front panel 20 mounts a switch housing 30 to the right of and below the hopper 14, as seen in FIG. 1. This housing encloses three pneumatic control valves (not shown) which are respectively connected to a driver plate actuator switch 32, a hopper actuator switch 34 and a die plate actuator switch 36. The switches extend from the pneumatic control valve housing 30 to a point where a user of the applicator device can actuate the control switches as desired to govern operation of the pneumatic cylinders as will be described below.

The rear panel 22 of the frame mounts a muffler or silencer shown generally at 38. The muffler includes a housing 40 in which is mounted a baffle material 42. The housing forms a cage having at least its top and rear faces largely open to permit escape of air from the baffle material. The baffle material can be made of any suitable material for reducing the noise of exhaust air from the pneumatic cylinders. Foam of various types could be used for this purpose. The foam provides so many alternate paths for the escape of air that it is not subject to the frequent clogging experiences by brass fittings of the prior art. All of the exhaust lines from the cylinders are supplied to the muffler 38.

The frame 12 also mounts front and rear die plate tracks shown generally at 44A, 44B on the top edges of the front and rear panels 20, 22, respectively. As best seen in FIG. 4, each track 44 includes a metal rail 46 which is fixed to the top land of the front and rear panels. On top of each rail 46 is a bearing strip 48 made of a material that is compatible with that of the die plate 16. In a preferred embodiment the die plate is made of nylon and in this case a suitable material for the bearing strip is Delrin. Each track 44 further includes an edge guide 50, also preferably made of Delrin, on top of the bearing strip. Overlying the edge guide 50 is a metal retainer 52. The rail 46, bearing strip 48, edge guide 50 and retainer 52 are all fixed to one of the frame panels 20, 22. The tracks 44 each define a channel in which the front and rear edges of the die plate 16 are constrained for strictly horizontal movement. The retainer 52 prevents any pitching or rolling of the die plate out of a horizontal plane. Similarly, the edge guides 50 prevent any yawing motion of the die plate.

Figure 5:
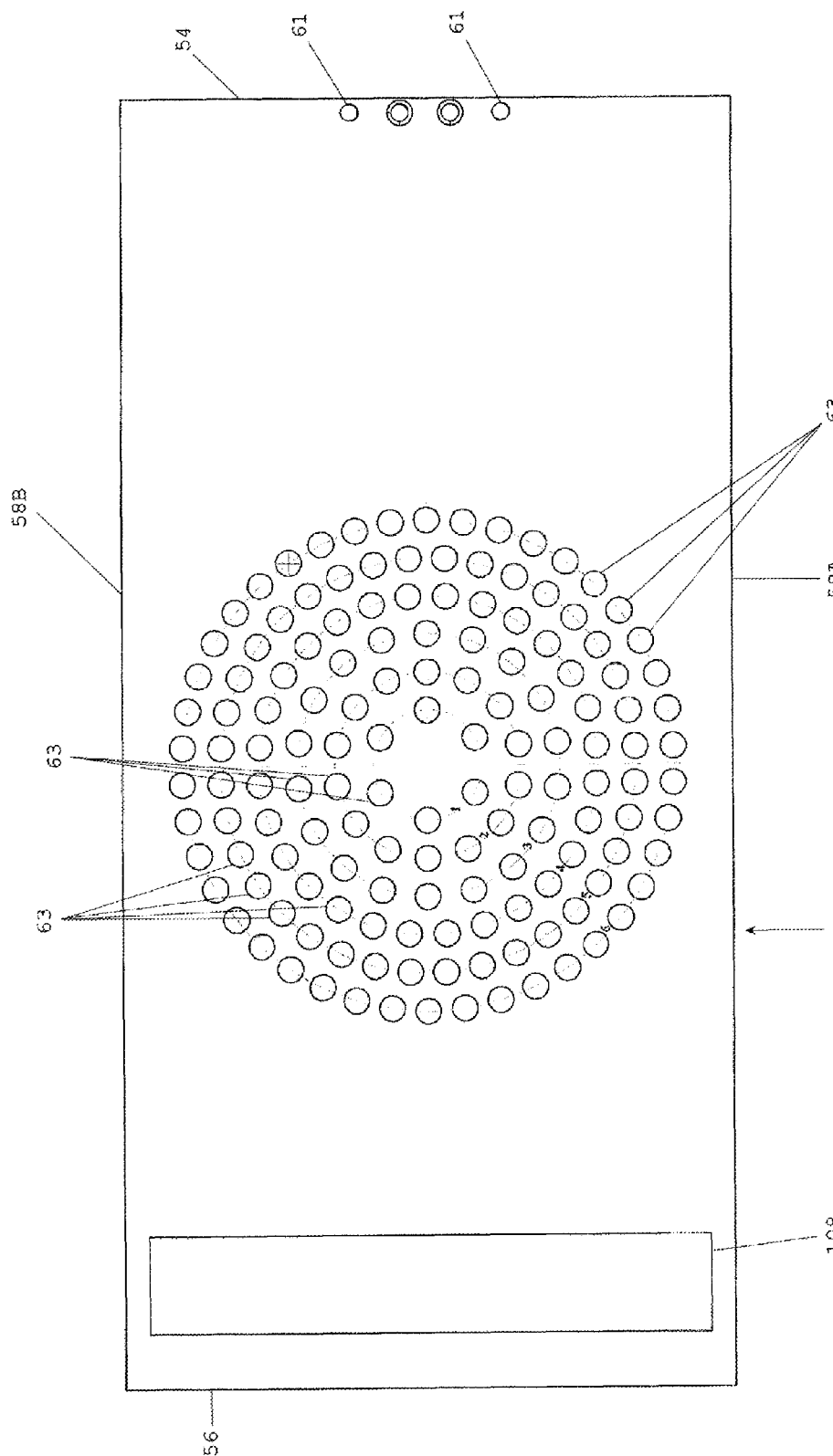
FIG. 5 is a top plan view of the die plate.

The die plate 16 is seen in FIGS. 2, 4 and 5. It includes a leading edge 54 and a trailing edge 56. The die plate also has front and rear edges 58A, 58B (FIG. 4) that are disposed in the tracks 44A, 44B, respectively, resting on the bearing strips 48. On the underside of the die plate 16 near the leading edge 54 is a cylinder adaptor 60. The cylinder adaptor may be attached by bolts extending through bolt holes 61 (FIG. 5). One end of a drive plate pneumatic cylinder is attached to the adaptor 60. The other end of the drive plate pneumatic cylinder is attached to a cross member of the frame. A knurled adjustment knob 62 is the only portion of the drive plate cylinder that is visible in the drawings. It will be understood that the drive plate cylinder is arranged to cause reciprocating movement of the die plate 16 left and right (in FIGS. 1-3) in the tracks 44A, 44B. It will also be understood that the die plate has a plurality of apertures 63 (FIG. 5) that extend fully through its thickness. With the die plate in the position shown in FIG. 2, the apertures are underneath the driver plate 18 and thus cannot be seen in FIG. 2.

The food hopper 14 has a generally rectangular box 64 with a flange 66 around its bottom. A Delrin seal and wiper 68 fits between the flange 66 and the retainers 52 and die plate 16. The bottom of the box 64, as well as the seal 68, is generally open so food products can move out of the box into the apertures of the die plate when the apertures are moved into alignment with the bottom of the box. The box is removably mounted on the frame. Handles 70 allow convenient grasping of the hopper to remove it for cleaning.

The top of the box 64 is open but a moveable pressure plate 72 fits just inside the inside dimensions of the box. The pressure plate 72 connects to one end of a hopper pneumatic cylinder 74. The other end of the hopper pneumatic cylinder 74 connects to a support member 76 which is hinged to the top of the box at 78. A latch 80 releasably connects the other end of the support member 76 to the box. The cylinder 74 applies pressure to the pressure plate 72 which in turn biases the food product in the box toward the bottom opening of the box and into the die plate apertures, if empty die plate apertures are present under the box. When the die plate apertures are withdrawn from under the box a solid portion of the die plate will be under the box. Thus, the solid portion of the die plate, together with the seal and wiper 68, prevents any unwanted movement of the food product out of the box even though pressure is maintained on the plate 72 and food product in the box 64. Also, it will be understood that there is a horizontal bottom or backing plate (not shown) underneath the box 64 and below the level of the die plate. The bottom plate may have a Delrin upper surface in sliding engagement with the die plate. A lower stainless steel portion provides rigidity to the bottom plate. The bottom plate prevents food particles from being pushed straight through the die plate apertures when they are present under the box.

The frame 12 further includes front and rear vertical support bars 82A, 82B which are attached to the front and rear panels 20, 22 respectively. The support bars mount a diagonal bracket 84. The bracket locates and supports a driver plate pneumatic cylinder 86. Cylinder 86 includes a movable rod 88 which is connected to an adaptor 90 on top of the driver plate 18.

The driver plate 18 itself is best seen in FIGS. 2 and 6. It comprises a central disk 92 on which the adaptor 90 is mounted. Four radially-extending supports or arms 93 are integrally attached to the central disk 92. Alternately, the radial supports could be separate pieces fixed to the central disk. The central disk has a plurality of tapped holes 95 for receiving a plurality of cylindrical fingers or push rods 96. The radial supports each have a plurality of through holes 97. In the illustrated embodiment each support has eight through holes but the number could vary.

The driver plate further includes three variably-sized, concentric rings surrounding the central disk 92. These include the small ring 94A, the medium ring 94B and the large ring 94C. The central disk 92 and each of the rings 94A, B, C have fixed to their undersides a plurality of cylindrical fingers or push rods 96. The fingers are disposed in a pattern than matches that of the plurality of apertures in the die plate. The diameter of the fingers is slightly less than that of the die plate apertures. Cross-sectional shapes other than round could be used for the apertures and fingers. Filled apertures 63 are placed in registry with the fingers 96 and when the driver plate 18 is lowered the fingers eject food particles from the filled die plate apertures as will be explained below.

The rings 94A, B, C rest on top of the radial supports 93 of the central disk 92 but are not fixed to the supports or the central disk. The diameter of the fingers 96 is less than that of the through holes 97 such that the fingers do not restrict movement of the rings relative to the driver plate. The rings can be selectably and releasably connected to the central disk 92 by means of two ring selector assemblies 98. Each assembly 98 includes a base 100 fixed to the central disk 92 and a plunger 102 which is horizontally slidable within the base. The plunger has a handle 104 at one end and a nose 106 at the other end. The plunger 102 is located just above the rings 94A, B, C. In one embodiment the central disk 92 may be sized to deposit food particles on a 10-inch diameter substrate and the rings 94A, B, C are sized to successively add the ability to evenly cover 12-inch, 14-inch and 16-inch substrates, respectively. Other sizes, shapes and numbers of the rings could be used as needed for a particular substrate. For a driver plate having a 16-inch large ring, there may be, for example, 144 fingers and the same number of die plate apertures. These numbers could vary depending on how many food pieces are desired to be deposited on a substrate.

A user can manipulate the handle 104 to slide the plunger 102 among four selectable positions, which may be defined by detents within the base 100. In a fully retracted position the plunger's nose 106 is withdrawn into the base 100. If both plungers 102 are in their fully retracted position, when the driver plate cylinder 86 is activated to drive the central disk 92 downwardly the central disk moves down under the force of the rod 88. But since the rings 94A, B, C merely rest on top of the radial supports carried by the central disk, the rings move down only under the force of gravity as the central disk's radial supports underneath the rings move down. Gravity alone, however, is not sufficient to drive the fingers through the die plate apertures and therefore the fingers of a non-connected (and thus non-driven) ring do not eject food particles. With the plungers 102 fully retracted only the fingers connected to the central disk 92 would eject food particles.

This arrangement of separate, concentric rings of the driver plate provides adjustability to permit the user to correlate the effective size of the driver plate with the size of the substrate. If a substrate, for example a pizza larger than the central disk 92 is being prepared, the user grasps the plunger handles 104 and extends the plungers to an extended position. In a first extended position the nose 106 overlies the small ring 94A. In this position when the cylinder 86 is activated to drive the central disk 92 downwardly the plungers effectively connect the small ring 94A to the central disk 92 so both of these parts are driven by the cylinder 86 and eject food particles, while the medium ring 94B and large ring 94C are not driven and do not eject food particles. It can be seen that further extension of the plungers 102 to second and third extended positions will add the medium and large rings 94B and 94C to the driven portions of the driver plate, respectively.

An optional oiler roller is shown schematically at 108 in FIGS. 2 and 5. The oiler roller is a cylinder mounted for rotation on top of the die plate 16 near its trailing edge 56. The roller extends into a bath of vegetable oil or the like and transfers that oil to the bottom surfaces of the driver plate's fingers 96 as the roller moves past the fingers during the filling and return strokes of the die plate. The oil on the fingers prevents food particles in the die plate apertures from sticking to the bottom of the fingers after the fingers are driven through the apertures.

It can be seen from FIG. 2 that the frame 12 is longer (considering the length to be in the left to right direction) than the die plate 16. This provides several benefits. It stabilizes the frame. It prevents the die plate from extending beyond the frame regardless of what position the die plate is in. The frame length is about 1.6 times that of the die plate. By way of example only, and not by limitation, the length of the frame can be about 52 inches and the length of the die plate can be about 32 inches. The elongated frame also assists in preventing pitching, rolling and yawing of the die plate during its reciprocating motion. The tracks 44 attached to the frame 12 also constrain the die plate to an essentially horizontal motion. This prevents premature wear of the die plate 16 and the hopper seal 68. It also prevents misalignment of the die plate with the hopper seal, which if it were to occur would permit leakage of food particles out the bottom of the hopper.

The use, operation and function of the applicator device are as follows. The machine is set up by connecting a source of compressed air to the pneumatic control valves in the switch housing 30. The default condition of the control valves places the die plate 16 in the retracted position of FIG. 2 and the driver plate 18 in the retracted position of FIGS. 1 and 3. The hopper cylinder is relieved which permits the user to release the latch 80 and pivot the support member 76 clockwise (as seen in FIG. 1) about hinge 78. This removes the support member 76 and pressure plate 72 from the box 64 and allows filling of food into the box. Once the box is full, the support member is rotated back so the pressure plate 72 rests on top of the food supply. The user activates hopper actuator switch 34 which causes pressurized air to flow to the hopper cylinder 74. The hopper cylinder then biases the pressure plate 72 toward the open bottom of the box 64. At this point, however, the food cannot go anywhere because the bottom of the box is closed off by the seal 68 and a solid portion of the die plate 16.

When the user is ready to deposit food particles on a substrate, e.g., sausage on a pizza, he or she places the substrate on the shelf 28. The plungers 102 of the ring selector assemblies 98 are set to match the size of the driver plate with the substrate's size. Then the die plate actuator switch 36 is activated. The die plate control valve directs compressed air to the die plate cylinder in a manner that causes a forward or filling stroke of the die plate. The die plate moves from the position of FIG. 2 to the right, causing the empty apertures of the die plate to move under the open bottom of the hopper. As the apertures move into communication with the hopper the pressure exerted by the pressure plate 72 causes food to be extruded into the apertures. The die plate slides forwardly far enough to expose all of its apertures to the open bottom of the hopper. The control valve then reverses the air pressure in the die plate cylinder to cause it to retract the die plate to its original position underneath the driver plate 18. The die plate apertures are now full of food and ready for deposition of the food particles on to the substrate.

Such deposition is effected by the driver plate 18. The user actuates the driver plate switch 32 which causes the driver plate control valve to direct compressed air to the driver plate cylinder 86 in manner that causes rod 88 to extend. The rod drives the central disk 92 downwardly, potentially driving with it one or more of the rings 94A, B, C, depending on the setting of the ring selector assemblies 98. As the driver plate moves down the fingers 96 fit into the die plate apertures and push the food particles therein out of the die plate. The food particles release from the fingers and drop onto the substrate below. The pneumatic control valve then reverses the air pressure in the driver plate cylinder 86 to cause it to retract the driver plate 18 to its original position above the die plate 16. Some or all of the die plate apertures are now empty and ready for the next filling stroke.

While the preferred form of the invention has been shown and described herein, it should be realized that there may be many modifications, substitutions and alterations thereto.

I claim:

1. A machine for applying food products to a substrate, comprising:
    a frame having a length;
    a hopper mounted on the frame for receiving food products therein, the hopper having a vertical axis;
    a driver plate mounted for reciprocal vertical motion on the frame adjacent the hopper, the driver plate having a vertical axis; and
    a die plate having a first portion with a plurality of apertures therein and a second, solid portion with no apertures therein, the die plate being mounted for reciprocal horizontal motion on the frame between a first position, wherein the solid portion intersects the hopper vertical axis and is underneath the hopper and in contact therewith to seal the hopper while the first portion of the die plate is underneath the driver plate and intersects the driver plate vertical axis, and a second position, wherein at least some of the apertures are underneath the hopper and intersect the hopper vertical axis and all of the apertures have passed underneath the hopper for receiving food products therefrom, the die plate having a length, the length of the frame being at least about 1.6 times the length of the die plate.

2. The machine of claim 1 wherein the driver plate includes a plurality of fingers and wherein the driver plate is movable to push the fingers through the apertures when the die plate is in the first position and thereby deposit food products on a substrate.

3. The machine of claim 1 further comprising a muffler attached to the frame.

4. The machine of claim 1 further comprising tracks formed on the frame which are engageable with the die plate to constrain the die plate to horizontal motion.

5. The machine of claim 4 wherein the die plate has front and rear edges and each track defines a channel in which one of the front and rear edges of the die plate is constrained.

6. The machine of claim 5 wherein each channel is defined by a rail fixed to the frame, an edge guide mounted on top of the rail, and a retainer mounted on the edge guide.

7. The machine of claim 6 wherein each track further comprises a bearing strip mounted on the rail.

8. A machine for applying food products to a substrate, comprising:
    a frame having first and second ends defining a length;
    a hopper mounted on the frame for receiving food products therein, the hopper having a vertical axis;
    a driver plate mounted for reciprocal vertical motion on the frame adjacent the hopper, the driver plate having a vertical axis; and
    a die plate having a first portion with a plurality of apertures therein and a second, solid portion with no apertures therein, the die plate being mounted for reciprocal horizontal motion on the frame between a first position, wherein the solid portion intersects the hopper vertical axis and is underneath the hopper and in contact therewith to seal the hopper while the first portion of the die plate is underneath the driver plate and intersects the driver plate vertical axis, and a second position, wherein at least some of the apertures are underneath the hopper and intersect the hopper vertical axis and all of the apertures have passed underneath the hopper for receiving food products therefrom, the die plate having a length defined by a leading edge and a trailing edge, the lengths of the frame and die plate being such that when the die plate moves between the first and second positions neither the leading edge nor the trailing edge of the die plate extends beyond the first and second ends of the frame.

9. The machine of claim 8 wherein the driver plate includes a plurality of fingers and the driver plate is movable to push the fingers through the apertures when the die plate is in the first position and thereby deposit food products on a substrate.

10. The machine of claim 8 further comprising a muffler attached to the frame.

11. The machine of claim 8 wherein the die plate has front and rear edges and each track defines a channel in which one of the front and rear edges of the die plate is constrained.

12. The machine of claim 11 wherein each channel is defined by a rail fixed to the frame, an edge guide mounted on top of the rail, and a retainer mounted on the edge guide.

13. The machine of claim 12 wherein each track further comprises a bearing strip mounted on the rail.

14. The machine of claim 8 wherein the frame further comprises front and rear tracks formed thereon, the tracks each defining its own three-sided channel which has an open side;
    and wherein the die plate has front and rear edges, the front edge extending through said open side of the channel of the front track and the rear edge extending through said open side of the channel in the rear track, the tracks supporting the die plate for reciprocal motion between a said first position and said second position, the tracks constraining the die plate to horizontal motion while preventing pitching, rolling or yawing motion.

15. The machine of claim 14 wherein the driver plate includes a plurality of fingers and wherein the driver plate is movable to push the fingers through the apertures when the die plate is in the first position and thereby deposit food products on a substrate.

16. The machine of claim 14 further comprising a muffler attached to the frame.

17. The machine of claim 14 wherein each channel is defined by a rail fixed to the frame, an edge guide mounted on top of the rail, and a retainer mounted on the edge guide.

18. The machine of claim 17 wherein each track further comprises a bearing strip mounted on the rail.

19. The machine of claim 18 wherein the bearing strip is made of a material that is compatible with that of the die plate.

\* \* \* \* \*